United States Patent
Liu et al.

(10) Patent No.: US 12,026,625 B2
(45) Date of Patent: Jul. 2, 2024

(54) ON-LINE PREDICTION METHOD OF SURFACE ROUGHNESS OF PARTS BASED ON SDAE-DBN ALGORITHM

(71) Applicant: DALIAN UNIVERSITY OF TECHNOLOGY, Liaoning (CN)

(72) Inventors: Kuo Liu, Liaoning (CN); Mingrui Shen, Liaoning (CN); Bo Qin, Liaoning (CN); Renjie Huang, Liaoning (CN); Mengmeng Niu, Liaoning (CN); Yongqing Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 881 days.

(21) Appl. No.: 15/734,940

(22) PCT Filed: Feb. 28, 2020

(86) PCT No.: PCT/CN2020/077096
§ 371 (c)(1),
(2) Date: Dec. 3, 2020

(87) PCT Pub. No.: WO2021/128577
PCT Pub. Date: Jul. 1, 2021

(65) Prior Publication Data
US 2021/0287098 A1    Sep. 16, 2021

(30) Foreign Application Priority Data
Dec. 24, 2019 (CN) .......................... 201911346390.7

(51) Int. Cl.
G06N 3/088   (2023.01)
G06N 3/04    (2023.01)
(Continued)

(52) U.S. Cl.
CPC ............. *G06N 3/088* (2013.01); *G06N 3/045* (2023.01); *G06N 3/047* (2023.01)

(58) Field of Classification Search
CPC ......... G06N 3/047; G06N 3/088; G06N 3/045
See application file for complete search history.

(56) References Cited

FOREIGN PATENT DOCUMENTS

| CN | 102880771 A | 1/2013 |
|----|-------------|--------|
| CN | 103761429 A | 4/2014 |

(Continued)

OTHER PUBLICATIONS

Cho et al. "Boltzmann Machines and Denoising Autoencoders for Image Denoising", 2013 (Year: 2013).*

(Continued)

*Primary Examiner* — Van C Mang
(74) *Attorney, Agent, or Firm* — MUNCY, GEISSLER, OLDS & LOWE, P.C.

(57) ABSTRACT

An on line prediction method of part surface roughness based on SDAE-DBN algorithm. The tri-axis acceleration sensor is adsorbed on the rear bearing of the machine tool spindle through the magnetic seat to collect the vibration signals of the cutting process, and a microphone is placed in the left front of the processed part to collect the noise signals of the cutting process of the machine tool; the trend term of dynamic signal is eliminated, and the signal is smoothed; a stacked denoising autoencoder is constructed, and the greedy algorithm is used to train the network, and the extracted features are used as the input of deep belief network to train the network; the real-time vibration and noise signals in the machining process are input into the deep network after data processing, and the current surface roughness is set as output by the network.

1 Claim, 5 Drawing Sheets

(51) Int. Cl.
G06N 3/045 (2023.01)
G06N 3/047 (2023.01)

(56) References Cited

FOREIGN PATENT DOCUMENTS

| CN | 107292051 A | 10/2017 |
| CN | 108596158 A | 9/2018 |
| CN | 108920812 A | 11/2018 |
| CN | 110059442 A | 7/2019 |
| CN | 110348075 A | 10/2019 |

OTHER PUBLICATIONS

Chen, "Predicting tool wear with multi-sensor data using deep belief networks", 2018 (Year: 2018).*
Yu, "Stacked convolutional sparse denoising auto-encoder for identification of defect patterns in semiconductor wafer map", 2019 (Year: 2019).*
Jian-bo, "Evolutionary manifold regularized stacked denoising autoencoders for gearbox fault diagnosis", 2019 (Year: 2019).*
Zou, Shibo, "Rapid Manufacturing of Microreactor for Chemical Synthesis Based on 3D Printing", Chinese Master's Theses Full-Text Database, Medicine & Health Sciences, Dec. 15, 2015, 69 pages (XP-055731322), (ISSN:1674-0246).

* cited by examiner

ON-LINE PREDICTION METHOD OF SURFACE ROUGHNESS OF PARTS BASED ON SDAE-DBN ALGORITHM

TECHNICAL FIELD

The present invention belongs to the field of intelligent monitoring of machining process, in particular relates to an on-line prediction method of surface roughness of parts based on stacked denoising autoencoder-deep belief network (SDAE-DBN).

BACKGROUND

Surface roughness is the main parameter to describe the surface micro morphology and measure the quality of parts. It not only affects the wear resistance, fatigue strength, corrosion resistance, sealing and matching stability of parts, but also affects the surface optical properties, electrical conductivity and thermal conductivity and appearance of parts. Traditional surface roughness measurement methods are mainly divided into contact measurement and non-contact measurement. In contact measurement, because the measuring tip is easy to wear and scratch the surface, its application in high-precision detection is limited. However, non-contact measurement is sensitive to the surface dirt of the parts, so it needs to be cleaned before measurement, which reduces the efficiency of roughness measurement. Therefore, how to accurately and efficiently realize the on-line measurement of part surface roughness has become one of the key problems in the field of machining.

At present, many domestic and foreign scholars have studied the surface roughness prediction technology. The research methods of surface roughness prediction mainly include: prediction model based on cutting theory and prediction model based on artificial intelligence. Among them, the prediction method based on cutting theory has low accuracy due to many variable parameters. The prediction model based on artificial intelligence is more and more used in surface quality prediction because of its good ability to approximate any complex nonlinear system.

In the aspect of surface quality prediction, domestic scholars have applied for some patents. In the patent "a prediction method of surface roughness of cemented carbide blade by chemical mechanical polishing" (application No.: CN201710552078.8), the experimental data are preprocessed by the anomaly detection algorithm based on Gaussian function, and the BP neural network prediction model optimized by genetic algorithm is established to predict the surface roughness; In the patent "a prediction method of machined surface roughness" (application No.: CN201810687856.9), the network weight and threshold are optimized by copula distribution estimation algorithm, and the network parameters are further modified based on BP algorithm, so as to realize the prediction of surface roughness; In the patent "prediction method of workpiece surface roughness in high speed machining" (application No.: CN201210426876.3), RBF neural network model is established, and the model is trained with sample data to realize the prediction of surface roughness; In the patent "a grinding surface roughness prediction method based on improved support vector machine algorithm" (application No.: CN201910538299.9), the data are divided into training set and test set by using the idea of cross validation, and the GOA-SVM prediction model is constructed to realize the grinding surface roughness prediction.

However, there are some problems in the methods used in the above patents, such as: (1) data features are extracted by artificial experience, which makes the data processing process cumbersome. (2) Network training needs a lot of labeled data, which limits its wide use in industry. Aiming at the problems of traditional neural network, this patent proposes an on-line prediction method of surface roughness based on SDAE-DBN algorithm.

SUMMARY

The purpose of the present invention is to provide an on-line prediction method for the surface roughness of parts based on SDAE-DBN, solve the problems of traditional methods such as extracting signal features by artificial experience and training neural network with a large number of labeled data, and realize the on-line prediction of the machined surface quality of parts.

In order to solve the above technical problems, the technical solution of the invention is as follows: firstly, the tri-axis acceleration sensor is adsorbed on the rear bearing of the machine tool spindle through the magnetic seat to collect the vibration signals of the cutting process, and a microphone is placed in the left front of the processed part to collect the noise signals of the cutting process of the machine tool; Secondly, the polynomial least square method is used to eliminate the trend term of the dynamic signal, and the five point cubic smoothing method is used to smooth the signal. Then, the processing data is intercepted and normalized. Thirdly, a stacked denoising autoencoder is constructed, and the greedy algorithm is used to train the network, and the extracted features are used as the input of deep belief network to train the network; Finally, the real-time vibration and noise signals in the machining process are input into the deep network after data processing, and the current surface roughness is set as output by the network, so as to realize the real-time prediction of surface roughness.

The specific technical solution of the invention is as follows:

An on-line prediction method of part surface roughness based on SDAE-DBN is proposed. The specific steps are as follows:

(1) Collect the Vibration and Noise Signals During Machining

The tri-axis acceleration sensor is attached to the rear bearing of the machine tool spindle through the magnetic base, and the microphone is placed in the front left of the workpiece to be processed. The vibration of the spindle and cutting noise during the machining process are collected in real time by using data acquisition software.

(2) Preprocess the Collected Data

The vibration and noise data collected are eliminated trend term and smoothed.

The polynomial least square method is used to eliminate the trend term of the signal. The processing signal collected in each processing is set as $\{x_{k_1}\}(k_1=1, 2, \ldots, n_1)$. The M-order polynomial $\hat{x}_{k_1}$ is selected to fit the sampling signal through formula (1).

$$\hat{x}_{k_1} = \sum_{i_1=0}^{M} a_{i_1} k_1^{i_1} (i_1 = 0, 1, \ldots, M) \qquad (1)$$

According to the principle of least square method, the appropriate coefficient $a_{i_1}$ is selected to minimize the sum of squares of errors between $x_{k_1}$ and $\hat{x}_{k_1}$.

$$e = \sum_{k_1=1}^{n_1} (x_{k_1} - \hat{x}_{k_1})^2 = \sum_{k_1=1}^{n_1} \left( \sum_{i_1=0}^{M} a_{i_1} k_1^{i_1} - x_{k_1} \right)^2 \quad (2)$$

In order to satisfy the minimum value of e, after obtaining the partial derivative of the coefficient $a_{i_1}$, let the value of the partial derivative be zero, and M+1 linear equations are obtained. By solving the equations, M+1 coefficients $a_{i_1}$ are obtained, and the trend fitting curve is obtained.

When M≥2, the trend term is a curve trend term, and M=1·3 is usually selected to eliminate the polynomial trend of the sampled data.

The signal is smoothed by five-point cubic smoothing method. The formula of the five-point cubic smoothing method is as follows:

$$\begin{cases} y_1 = \frac{1}{70}[69x_1 + 4(x_2 + x_4) - 6x_3 - x_5] \\ y_2 = \frac{1}{35}[2(x_1 + x_5) + 27x_2 + 12x_3 - 8x_4] \\ y_1 = \frac{1}{35}[-3(x_{j_1-2} + x_{j_1+2}) + 12x_{j_1-1} + 12x_{j_1+1} + 17x_{j_1}] \\ y_{m-1} = \frac{1}{35}[2(x_{m-4} + x_m) - 8x_{m-3} + 12x_{m-2} + 27x_{m-1}] \\ y_m = \frac{1}{70}[-x_{m-4} + 4(x_{m-3} + x_{m-1}) - 6x_{m-2} + 69x_m] \end{cases} \quad (3)$$

Among them, $j_1$=3, 4 . . . , m−2, m is the number of data points (3) Data Interception and Normalization According to the characteristics of vibration signal mutation at cut-in and cut-out point in machining process, the dynamic signal of actual machining process is intercepted, and the surface roughness of machined surface is measured. According to the measured surface roughness $R_a$, it is divided into qualified and unqualified situations.

The dynamic signal of cutting process is normalized to [0,1] according to formula (4).

$$X' = \frac{X - X_{min}}{X_{max} - X_{min}} \quad (4)$$

Among them, X' are the normalized results of the collected data, $X_{max}$ and $X_{min}$ are the maximum and minimum values of the collected data during processing.

The normalized dynamic signal is divided into training set and test set according to the ratio of 10:3.

(4) The Construction and Training of Stacked Denoising Autoencoder

Compared with the autoencoder, the denoising autoencoder can learn abstract features from the original data with superimposed noise, and the learned features have better robustness, and the network can avoid simply learning the same signal features.

The first coding layer of stacked denoising autoencoder "destroys" normalized data X' into data X" by random mapping transformation q, and maps it to hidden layer according to formula (5).

$$y' = f_{\theta_1}^{(1)}(X'') = g(WX'' + b) \quad (5)$$

Among them, W is the encoding weight matrix of the first coding layer, b is the encoding bias vector of the first coding layer, and g is the activation function of the first coding layer, and $f_{\theta_1}^{(1)}$ is the encoding parameter of the first coding layer.

The first decoding layer of stacked denoising autoencoder reconstructs the implied representation of hidden layer data according to formula (6).

$$X''' = f_{\theta_2}^{(1)}(y') = g(W'y' + b') \quad (6)$$

Among them, W' is the binding weight of the first decoding layer, b' is the decoding bias vector of the first decoding layer, and $f_{\theta_2}^{(1)}$ is the decoding parameter of the first decoding layer.

In the training process of the denoising autoencoder, the input data X' is reconstructed into X''', and the network weight and bias are adjusted continuously to minimize the network loss function.

The working principle of denoising autoencoder 2, denoising autoencoder 3 and denoising autoencoder 4 are the same as that of denoising autoencoder 1.

(5) The Construction and Training of Deep Belief Network

The signal features extracted from the denoising autoencoder are used as the input of neural network to train the deep belief network model. Deep belief network is a generative structure diagram model with multiple hidden layers, which is composed of several layers of restricted Boltzmann machine (RBM).

The restricted Boltzmann machine is an energy based model, and its joint probability distribution is determined by formula (7).

$$E(v, h; \theta_1) = -\sum_{i_2=1}^{V} \sum_{j_2=1}^{H} w_{i_2 j_2} v_{i_2} h_{j_2} - \left( \sum_{i_2=1}^{V} d_{i_2} v_{i_2} + \sum_{j_2=1}^{H} c_{j_2} h_{j_2} \right) \quad (7)$$

Among them, $v_{i_2}$ and $h_{j_2}$ are the binary states of the visible unit $i_2$ and the hidden unit $j_2$, $\theta_1 = \{w, d, c\}$ are the parameters of the model: $w_{1,j_2}$ are the weight between the visible unit $i_2$ and the hidden unit $j_2$, $d_{i_2}$ and $c_{j_2}$ are their bias, and V and H are the number of visible units and hidden units.

From the structural properties of restricted Boltzmann machine, it can be concluded that the activation state of neurons is conditionally independent. When the input signal is input into the visible layer, the visible layer will determine the state of each neuron in the hidden layer. The probability of activation of the $j_2$ neuron in the hidden layer is calculated by formula (8)

$$P(h_{j_2} = 1|v) = f(E_{j_2}) = \frac{1}{1 + e^{-E_{j_2}}} \quad (8)$$

Similarly, the probability of activation of the $i_2$ neuron in the visible layer is calculated by equation (9)

$$P(v_{i_2} = 1|h) = f(E_{i_2}) = \frac{1}{1 + e^{-E_{i_2}}} \quad (9)$$

Where θ(•) is the activation function of the network.

As a semi-supervised deep learning algorithm, deep belief network greedily trains each layer (from low to high) as RBM by using the activation of the previous layer as input.

The specific training process is as follows: firstly, one RBM is fully trained; secondly, the weight and bias of the first RBM are fixed, and the state of its hidden neurons is used as the input vector of the second RBM; after the second RBM is fully trained, the second RBM is stacked on top of the first RBM, and the above steps are repeated until the preset number of times is reached. After the training of multiple RBM stack models, a Softmax classification layer is added to the top layer of the network to classify the surface roughness.

Given $k_2$ class training data $\{(x^{(1)}, y^{(1)}), (x^{(2)}, y^{(2)}), \ldots (x^{(n_2)}, y^{(n_2)})\}$ of $n_2$ samples, where the sample set is $\{x^{(i_3)}\}_{i_3=1}^{n_2}$ and the label set is $\{y^{(i_3)}\}_{i_3=1}^{n_2}$, $y^{(i_3)} \in \{1, 2, \ldots, k_2\}$. The Softmax function is used to estimate the probability value of each category. The probability value is calculated by formula (10).

$$P(y^{(i_3)} = j_3 | x^{(i_3)}; \theta_2) = \frac{1}{\sum_{l=1}^{k_2} e^{\theta_{2l}^T x^{(i_3)}}} \begin{bmatrix} e^{\theta_{21}^T x^{(i_3)}} \\ e^{\theta_{22}^T x^{(i_3)}} \\ \ldots \\ e^{\theta_{2k}^T x^{(i_3)}} \end{bmatrix} \quad (10)$$

Among them, $j_3 = 1, 2, \ldots, k_2$. $\theta_2 = [\theta_{2_1}, \theta_{2_2}, \ldots, \theta_{2_l}]$ is a parameter of the Softmax regression model.

$$\frac{1}{\sum_{l=1}^{k_2} e^{\theta_{21}^T x^{(i_3)}}}$$

normalize the probability distribution so that the sum of all probabilities is 1.

The cost function of Softmax regression model is as follows:

$$J(\theta_2) = -\frac{1}{n_2} \left[ \sum_{i_3=1}^{n_2} \sum_{j_3=1}^{k_2} 1\{y^{(i_3)} = j_3\} \log \frac{e^{\theta_{2j_3}^T x^{(i_3)}}}{\sum_{l=1}^{k_2} e^{\theta_{2l}^T x^{(i_3)}}} \right] \quad (11)$$

Where $1\{\bullet\}$ is the index function. If the condition is true, it returns 1, otherwise it is 0. Softmax regression model is a supervised learning model, which uses error back-propagation algorithm to update parameters iteratively to minimize the cost function, so as to find the optimal parameters to adapt to the training set.

After the training, the test set is used to test the deep belief network. When the test accuracy is higher than 90%, the model can be used to predict the surface roughness.

(6) The Real-Time Prediction of Surface Roughness

In the actual processing process, the collected dynamic signals are input into the stacked denoising autoencoder network model to automatically extract the signal features, and then the extracted features are used as the input of the deep belief network to train the network model, and the output of the model is the quality of the surface. When the surface roughness is qualified, the model output is 0; when the surface roughness is unqualified, the model output is 1.

The beneficial effects of the invention are as follows:

(1) It provides a new method for the prediction of surface roughness of parts, and solves the problem of extracting signal features by manual experience and requiring a large number of labeled data.

(2) The stacked denoising autoencoder is used to extract the collected dynamic signal features, which reduces the participation of manual and expert experience, avoids the interference caused by human factors, and saves time and effort.

(3) The deep belief network is used to predict the surface roughness of parts with high accuracy, which can reduce the acquisition of labeled data, reduce the labor, material and time costs of data acquisition, and avoid the problem that traditional neural network is easy to fall into local minimum points.

(4) The accuracy of surface roughness prediction is improved.

DRAWINGS

DETAILED DESCRIPTION

Figure 1:
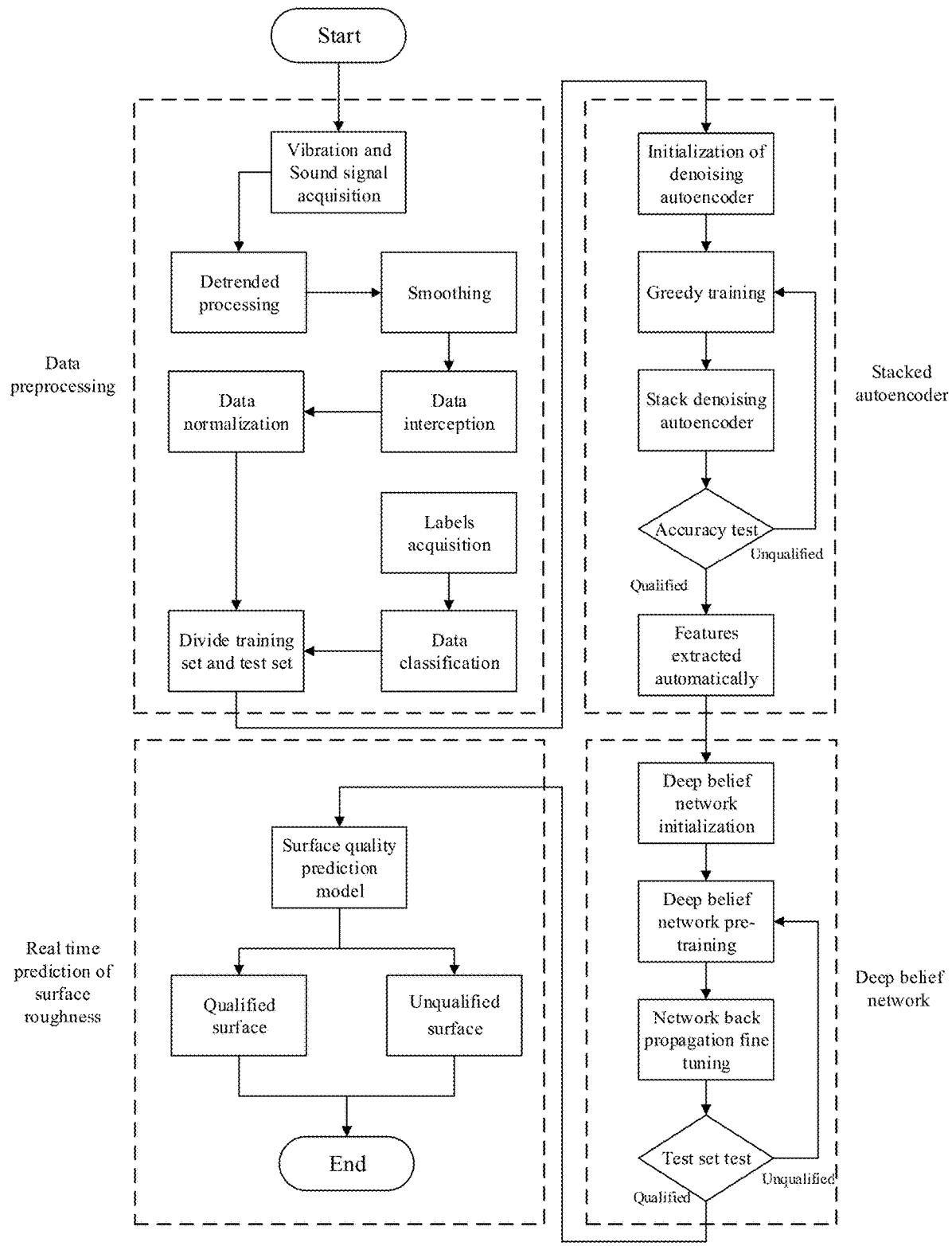
FIG. 1 shows the overall structure of the method of on-line prediction for surface roughness of parts based on SDAE-DBN.
Figure 2:
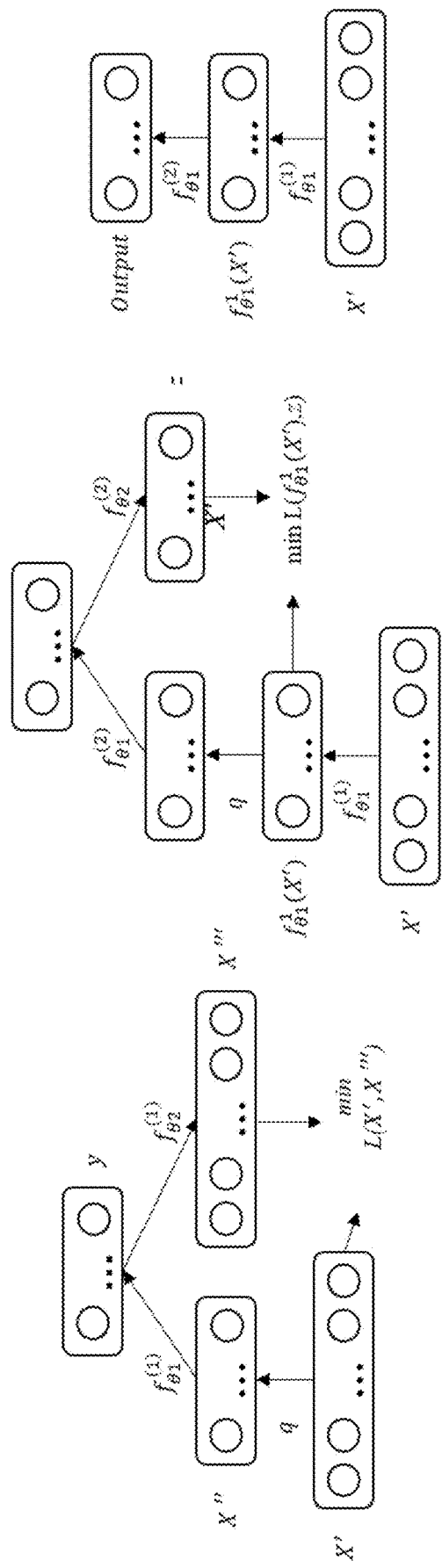
FIG. 2 shows the working principle of stacked denoising autoencoder.
Figure 3:
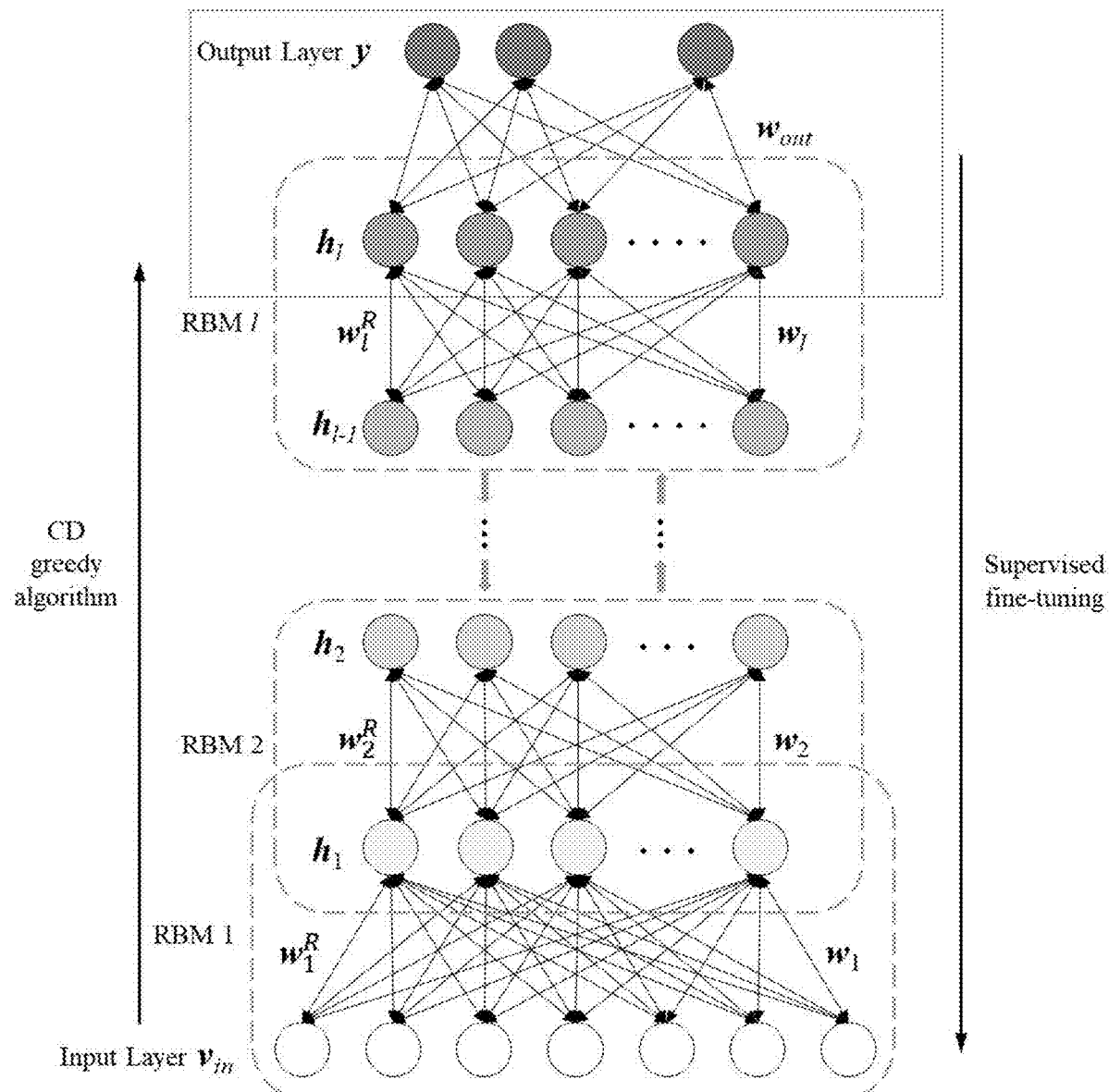
FIG. 3 shows the working principle of deep belief network.
Figure 4:
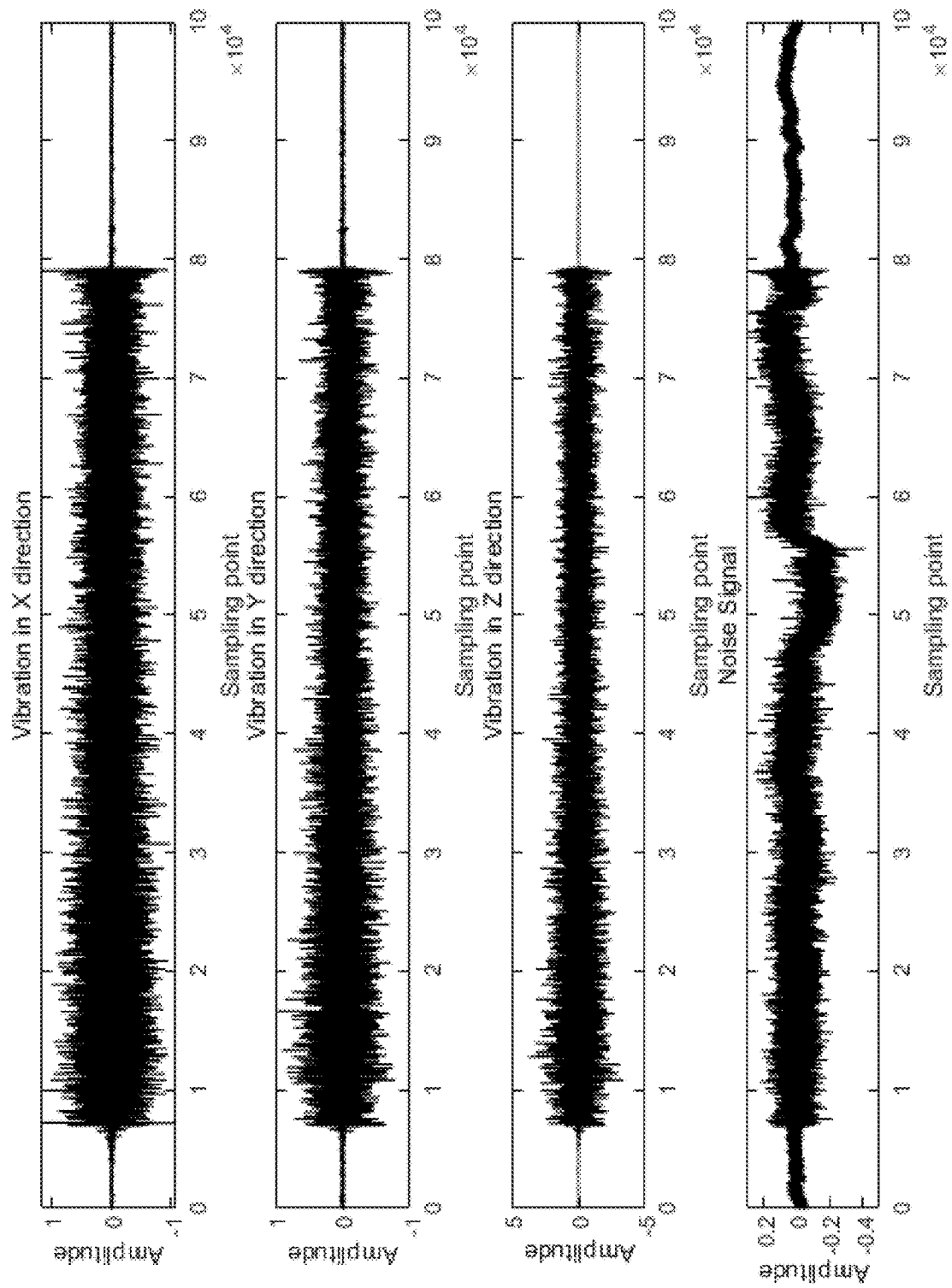
FIG. 4 shows the vibration and noise signals collected during the machining process.
Figure 5:
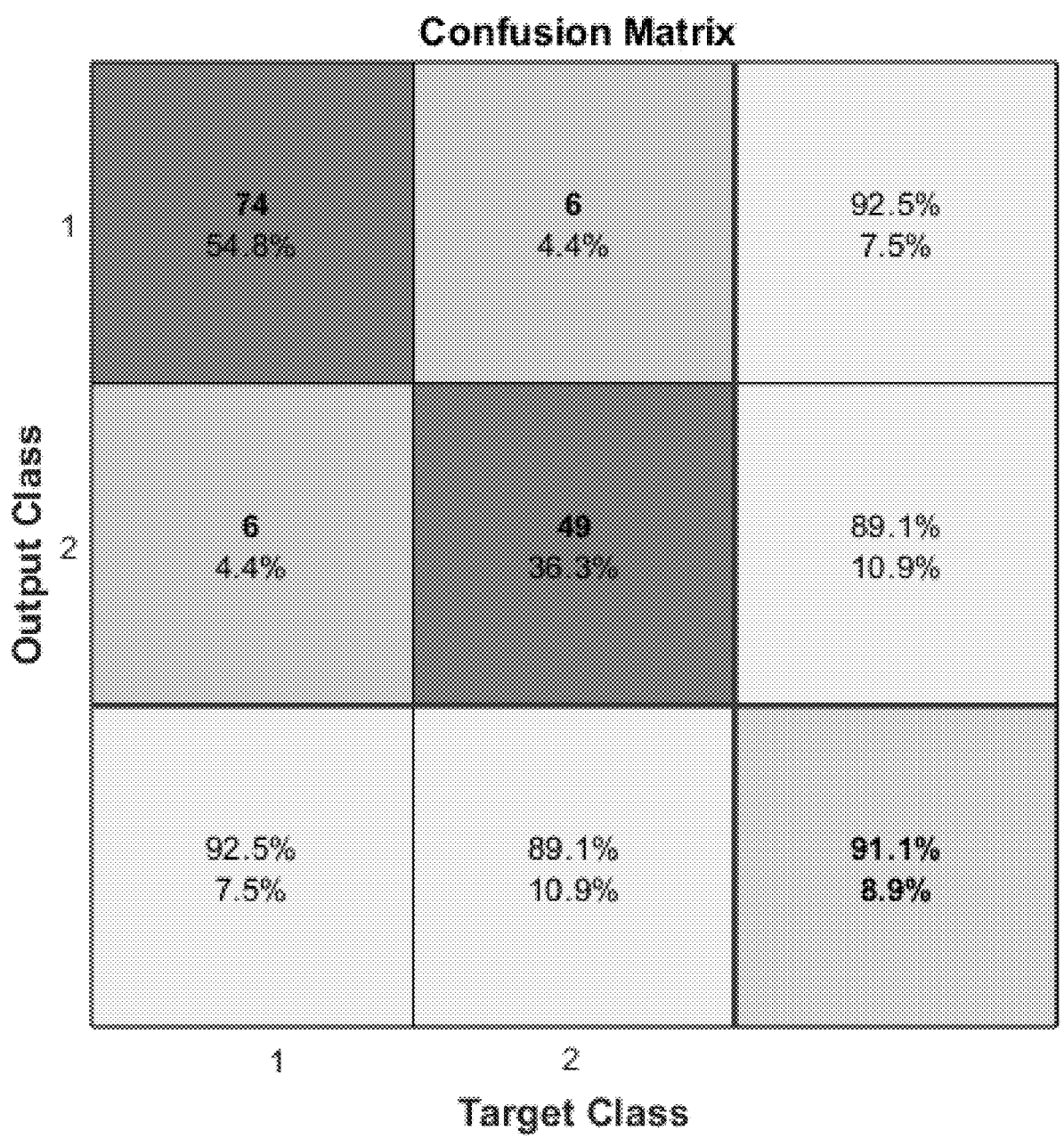
FIG. 5 shows the predicted results of surface roughness.

In order to make the purpose, technical solution and advantages of the invention clearer, the present invention is described in detail in combination with the specific implementation of on-line prediction of part surface roughness based on SDAE-DBN and with reference to the attached drawings. Based on the technical solution of the invention, the embodiment provides detailed implementation and specific operation process, but the protection scope of the invention is not limited to the following embodiments.

Taking the milling process of a three axis vertical CNC machine tool as an example, the implementation of the invention is described in detail.

(1) Collect the Vibration and Noise Signals During Machining

Fix the microphone on the left front of the workpiece through the bracket, and align it with the machined surface. The tri-axis acceleration sensor is attached to the rear bearing of the machine tool spindle through the magnetic base. In the process of machining, the sampling frequency of dynamic data is set at 1 kHz to collect vibration and noise signals.

(2) Preprocess the Collected Data

The collected dynamic signals are processed by detrend and smoothing. The least square method is used to eliminate the polynomial trend of the sampled data, where M=2. The data were smoothed by five point cubic smoothing method.

(3) Data Interception and Normalization

The dynamic signal of the actual machining process is intercepted by the characteristic of vibration signal mutation at the cut-in and cut-out point in the machining process, and the surface roughness of the machined surface is measured. According to the measured surface roughness $R_a$. It can be divided into qualified and unqualified situations.

The dynamic signal of cutting process is normalized to [0,1]. The normalized dynamic signal is divided into training set and test set according to the ratio of 10:3. Among them, the training set sample number is 460, the test set sample number is 135.

(4) The Construction and Training of Stacked Denoising Autoencoder

Four denoising autoencoders are stacked to construct the network. The number of neurons in the input layer and output layer of the autoencoder 1 is 7500, and the number of neurons in the hidden layer is 3000. The number of neurons in the input layer and output layer of the autoencoder 2 is 3000, and the number of neurons in the hidden layer is 1000. The number of neurons in the input layer and output layer of autoencoder 3 is 1000, the number of neurons in hidden layer is 300, the number of neurons in input layer and output layer of autoencoder 4 is 300, and the number of neurons in hidden layer is 100. The data is used to train the stacked denoising autoencoder, and the output is the signal features extracted by the autoencoder.

(5) The Construction and Training of Deep Belief Network

The feature of training set extracted by denoising autoencoder is used as the input of neural network to train the deep belief network model. Among them, the number of hidden layers of the deep belief network is set to 2, the number of hidden layer nodes is 60 and 20, the learning rate is set to 0.001, the number of pre-training iterations is set to 1000, and the number of iterations for fine tuning is set to 1000. The surface roughness of the machined parts is set as output. Then the network is tested with test set, and the test accuracy is 91.1%. The model can be used for on-line prediction of surface roughness.

(6) The Real-Time Prediction of Surface Roughness

After data preprocessing, the vibration and noise signals collected in the actual machining process are input into the stacked denoising autoencoder model to extract features automatically, and the extracted features are used as the input of deep belief network to predict the quality of surface roughness.

The invention claimed is:

1. An on-line prediction method of surface roughness of parts based on SDAE-DBN algorithm, wherein, firstly, a tri-axis acceleration sensor is adsorbed on a rear bearing of machine tool spindle through magnetic seat to collect vibration signals of cutting process, and a microphone is placed in the left front of a processed part to collect noise signals of the cutting process of the machine tool; secondly, a polynomial least square method is used to eliminate a trend term of a dynamic signal, and a five point cubic smoothing method is used to smooth the dynamic signal; then, a processing data is intercepted and normalized; thirdly, a stacked denoising autoencoder is constructed, and a greedy algorithm is used to train an network, and extracted features are used as an input of deep belief network to train the network; finally, a real-time vibration and the noise signals in a machining process are input into the deep belief network after data processing, and a current surface roughness is set as output by the network, so as to realize a real-time prediction of surface roughness;

(1)
the tri-axis acceleration sensor is attached to the rear bearing of the machine tool spindle through the magnetic seat, and the microphone is placed in the front left of the processed part to be processed; vibration of spindle and cutting noise during the machining process are collected in real-time;

(2)
the vibration and noise data collected are eliminated trend term and smoothed;

the polynomial least square method is used to eliminate the trend term of the dynamic signal; a processing signal collected in each processing is set as $\{x_{k_1}\}(k_1=1, 2, \ldots, n_1)$; M-order polynomial $\hat{x}_{k_1}$ is selected to fit a sampling signal through formula (1);

$$\hat{x}_{k_1} = \sum_{i_1=0}^{M} a_{i_1} k_1^{i_1} (i_1 = 0, 1, \ldots, M) \quad (1)$$

according to the principle of least square method, an appropriate coefficient $a_{i_1}$ is selected to minimize a sum of squares of errors between $x_{k_1}$ and $\hat{x}_{k_1}$;

$$e = \sum_{k_1=1}^{n_1} (x_{k_1} - \hat{x}_{k_1})^2 = \sum_{k_1=1}^{n_1} \left(\sum_{i_1=0}^{M} a_{i_1} k_1^{i_1} - x_{k_1}\right)^2 \quad (2)$$

in order to satisfy a minimum value of e, after obtaining a partial derivative of the coefficient $a_i^1$, let a value of the partial derivative be zero, and M+1 linear equations are obtained; by solving equations, M+1 coefficients $a_{i_1}$ are obtained, and a trend fitting curve is obtained;

when M≥2, the trend term is a curve trend term, and M=1~3 is selected to eliminate a polynomial trend of sampled data;

the dynamic signal is smoothed by the five-point cubic smoothing method; formula of the five-point cubic smoothing method is as follows:

$$\begin{cases} y_1 = \frac{1}{70}[69x_1 + 4(x_2 + x_4) - 6x_3 - x_5] \\ y_2 = \frac{1}{35}[2(x_1 + x_5) + 27x_2 + 12x_3 - 8x_4] \\ y_{j_1} = \frac{1}{35}\left[-3(x_{j_1-2} + x_{1+2}) + 12x_{j_1-1} + 12x_{j_1+1} + 17x_{j_1}\right] \\ y_{m-1} = \frac{1}{35}[2(x_{m-4} + x_m) - 8x_{m-3} + 12x_{m-2} + 27x_{m-1}] \\ y_m = \frac{1}{70}[-x_{m-4} + 4(x_{m-3} + x_{m-1}) - 6x_{m-2} + 69x_m] \end{cases} \quad (3)$$

among them, $j_1=3, 4 \ldots, m-2$, m is a number of data points;

(3)
according to characteristics of vibration signal mutation at cut-in and cut-out point in the machining process, the dynamic signal of actual machining process is intercepted, and a surface roughness of machined surface is measured; according to the surface roughness $R_a$, it is divided into qualified and unqualified situations;

the dynamic signal of the cutting process is normalized to [0,1] according to formula (4);

$$X' = \frac{X - X_{min}}{X_{max} - X_{min}} \quad (4)$$

among them, X' are normalized results of collected data, $X_{max}$ and $X_{min}$ are maximum and minimum values of the collected data during the machining processing;

a normalized dynamic signal is divided into training set and test set according to a ratio of 10:3;

(4)

a first coding layer of stacked denoising autoencoder 1 "destroys" normalized data X' into data X" by random mapping transformation q, and maps it to hidden layer according to formula (5);

$$y' = f_{\theta_1}^{(1)}(X'') = g(WX'' + b) \qquad (5)$$

among them, W is an encoding weight matrix of the first coding layer, b is an encoding bias vector of the first coding layer, and g is an activation function of the first coding layer, and $f_{\theta_1}^{(1)}$ is an encoding parameter of the first coding layer;

a first decoding layer of stacked denoising autoencoder reconstructs implied representation of hidden layer data according to formula (6);

$$X''' = f_{\theta_2}^{(1)}(y') = g(W'y' + b') \qquad (6)$$

among them, W' is a binding weight of the first decoding layer, b' is a decoding bias vector of the first decoding layer, and $f_{\theta_2}^{(1)}$ is a decoding parameter of the first decoding layer;

in a training process of the denoising autoencoder, the data X' is reconstructed into X''', and network weight and bias are adjusted continuously to minimize network loss function;

a working principle of denoising autoencoder 2, denoising autoencoder 3 and denoising autoencoder 4 are the same as that of the denoising autoencoder 1;

(5)

signal features extracted from denoising autoencoder are used as the input of neural network to train the deep belief network; the deep belief network is a generative structure diagram model with multiple hidden layers, which is composed of several layers of restricted Boltzmann machine;

the restricted Boltzmann machine is an energy based model, and its joint probability distribution is determined by formula (7);

$$E(v, h; \theta_1) = -\sum_{i_2=1}^{V}\sum_{j_2=1}^{H} w_{i_2 j_2} v_{i_2} h_{j_2} - \left(\sum_{i_2=1}^{V} d_{i_2} v_{i_2} + \sum_{j_2=1}^{H} c_{j_2} h_{j_2}\right) \qquad (7)$$

among them, $v_{i_2}$ and $h_{j_2}$ are binary states of a visible unit $i_2$ and a hidden unit $j_2$, $\theta_1 = \{w, d, c\}$ are parameters of the energy based model: $w_{i_2 j_2}$ are a weight between the visible unit $i_2$ and the hidden unit $j_2$, $d_{i_2}$ and $c_{j_2}$ are their bias, and V and H are a number of visible units and hidden units;

from structural properties of the restricted Boltzmann machine, which is concluded that an activation state of neurons is conditionally independent; when an input signal is input into a visible layer, the visible layer determines a state of each neuron in a hidden layer; a probability of activation of a $j_2$ neuron in the hidden layer is calculated by formula (8):

$$P(h_{j_2} = 1|v) = f(E_{j_2}) = \frac{1}{1 + e^{-E_{j_2}}} \qquad (8)$$

similarly, the probability of activation of a $i_2$ neuron in the visible layer is calculated by equation (9):

$$P(v_{i_2} = 1|h) = f(E_{i_2}) = \frac{1}{1 + e^{-E_{i_2}}} \qquad (9)$$

where $f(\cdot)$ is a activation function of the network;

as a semi-supervised deep learning algorithm, deep belief network greedily trains each layer, from low to high, as RBM by using an activation of the previous layer as input; a specific training process is as follows: firstly, one RBM is fully trained; secondly, weight and bias of a first RBM are fixed, and a state of the first RBM of hidden neurons is used as an input vector of a second RBM; after the second RBM is fully trained, the second RBM is stacked on top of the first RBM, and above steps are repeated until a preset number of times is reached; after training of multiple RBM stack models, a Softmax classification layer is added to a top layer of the network to classify a surface roughness;

given $k_2$ class training data $\{(x^{(1)}, y^{(1)}), (x^{(2)}, y^{(2)}), \ldots (x^{(n_2)}, y^{(n_2)})\}$ of $n_2$ samples, where a sample set is $\{x^{(i_3)}\}_{i_3=1}^{n_2}$ and a label set is $\{y^{(i_3)}\}_{i_3=1}^{n_2}$, $y^{(i_3)} \in \{1, 2, \ldots, k_2\}$; a Softmax function is used to estimate a probability value of each category; the probability value is calculated by formula (10);

$$P(y^{(i_3)} = j_3 | x^{(i_3)}; \theta_2) = \frac{1}{\sum_{l=1}^{k_2} e^{\theta_{2_l}^T x^{(i_3)}}} \begin{bmatrix} e^{\theta_{2_1}^T x^{(i_3)}} \\ e^{\theta_{2_2}^T x^{(i_3)}} \\ \ldots \\ e^{\theta_{2_k}^T x^{(i_3)}} \end{bmatrix} \qquad (10)$$

among them, $j_3 = 1, 2, \ldots, k_2$; $\theta_2 = [\theta_{2_1}, \theta_{2_2}, \ldots, \theta_{2_l}]$ is a parameter of a Softmax regression model;

$$\frac{1}{\sum_{l=1}^{k_2} e^{\theta_{2_1}^T x^{(i_3)}}}$$

normalizes a probability distribution so that a sum of all probabilities is 1;

s cost function of the Softmax regression model is as follows:

$$J(\theta_2) = -\frac{1}{n_2}\left[\sum_{i_3=1}^{n_2}\sum_{j_3=1}^{k_2} 1\{y^{(i_3)} = j_3\}\log\frac{e^{\theta_{2_{j_3}}^T x^{(i_3)}}}{\sum_{l=1}^{k_2} e^{\theta_{2_l}^T x^{(i_3)}}}\right] \qquad (11)$$

where $1\{\cdot\}$ is an index function; if condition is true, the index function returns 1, otherwise the index function is 0; the Softmax regression model is a supervised learning model, which uses error back-propagation algorithm to update parameters iteratively to minimize a cost function, so as to find optimal parameters to adapt to a training set;

after training, a test set is used to test the deep belief network; when the test accuracy is higher than 90%, the deep belief network is used to predict the surface roughness;

(6) in an actual processing process, collected dynamic signals are input into a stacked denoising autoencoder network model to automatically extract signal features, and then the extracted features are used as an input of the deep belief network to train the stacked denoising autoencoder network model, and an output of the stacked denoising autoencoder network model is a quality of a surface; when a surface roughness is qualified, the stacked denoising autoencoder network model output is 0; when the surface roughness is unqualified, the stacked denoising autoencoder network model output is 1.

* * * * *